(12) United States Patent
Zenda

(10) Patent No.: US 8,544,784 B2
(45) Date of Patent: Oct. 1, 2013

(54) LINE TIGHTENING DEVICE

(75) Inventor: Richard J. Zenda, Plains, PA (US)

(73) Assignee: Cargazen, Inc., Wilkes-Barre, PA (US)

( * ) Notice: Subject to any disclaimer, the term of this patent is extended or adjusted under 35 U.S.C. 154(b) by 201 days.

(21) Appl. No.: 13/267,399

(22) Filed: Oct. 6, 2011

(65) Prior Publication Data

US 2012/0085852 A1    Apr. 12, 2012

Related U.S. Application Data

(60) Provisional application No. 61/391,294, filed on Oct. 8, 2010, provisional application No. 61/436,117, filed on Jan. 25, 2011.

(51) Int. Cl.
*B65H 75/38* (2006.01)

(52) U.S. Cl.
USPC .................. 242/388.1; 242/388.2; 242/388.5

(58) Field of Classification Search
USPC ................. 242/388.1, 388.2, 388.5; 24/71.1; 211/119.15
See application file for complete search history.

(56) References Cited

U.S. PATENT DOCUMENTS

| | | | | |
|---|---|---|---|---|
| 830,978 | A | * | 9/1906 | Dunn ........................ 242/388.2 |
| 1,191,598 | A | | 7/1916 | Hofstrand |
| 1,373,967 | A | | 4/1921 | Lofquist |
| 1,792,468 | A | * | 2/1931 | Sheckels et al. ........... 242/388.4 |
| 1,855,049 | A | | 7/1931 | Harvey et al. |
| 2,090,005 | A | * | 8/1937 | Kendzy ..................... 242/388.4 |
| 2,316,950 | A | * | 4/1943 | Goeller .................... 211/119.15 |
| 2,371,295 | A | * | 3/1945 | Hopkins ..................... 24/601.8 |
| 2,450,358 | A | | 11/1945 | Romano |
| 3,568,261 | A | * | 3/1971 | Korb ............................. 24/71.1 |
| 3,879,805 | A | | 4/1975 | Gretter |
| 4,254,537 | A | * | 3/1981 | Malacheski et al. .......... 242/388 |
| 5,012,559 | A | * | 5/1991 | Flannery .................... 242/405.1 |

* cited by examiner

*Primary Examiner* — Sang Kim
(74) *Attorney, Agent, or Firm* — Law Offices of Grady L. White, LLC

(57) ABSTRACT

A line tightening device with a detachable handle, a hook and a coupler for securing the handle and the hook together while the tightener is being used. After the line tightener is used to achieve the desired tension in the line tightened, the handle and coupler can be quickly and easily disengaged and removed from the hook, thereby leaving only the hook attached to the tightened line. The hook is adapted for tightening the line by forming and fixing convolutions about its shank. A tether secures the hook to adjacent portions of the line to prevent accidental separation of the hook from the tensioned line.

23 Claims, 7 Drawing Sheets

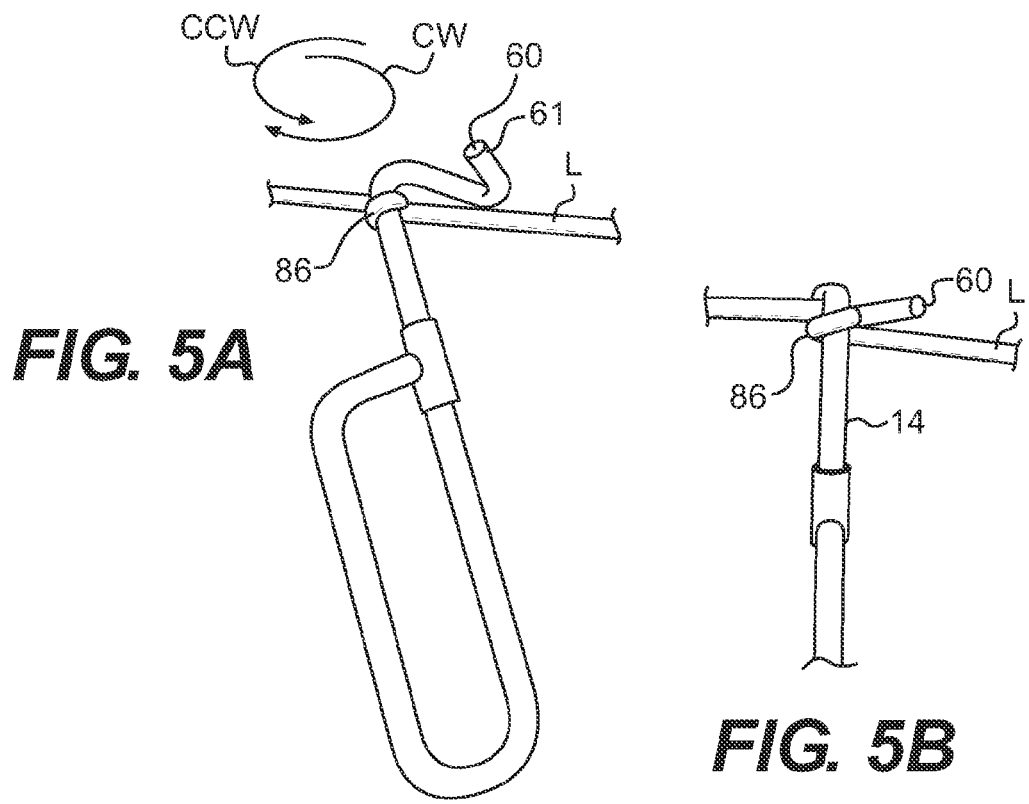
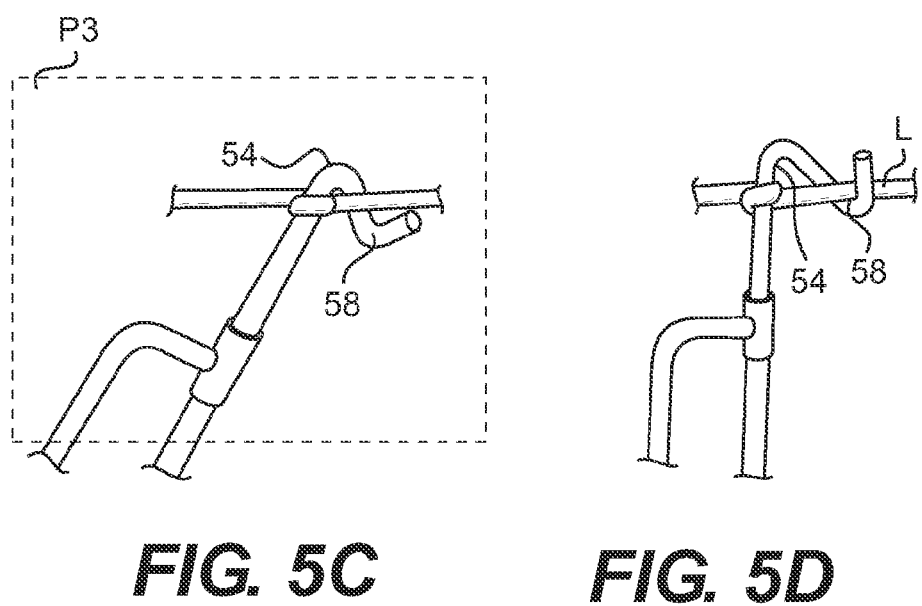

LINE TIGHTENING DEVICE

CROSS-REFERENCE TO RELATED APPLICATIONS

This application is related to and claims priority under 35 U.S.C. §119 to provisional application Nos. 61/391,294, filed Oct. 8, 2010 and 61/436,117, filed on Jan. 25, 2011, which are incorporated into this application in its entirety by this reference.

RELATED ART

U.S. Pat. No. 4,254,537 to Malacheski, et al., which is hereby incorporated in its entirety by this reference, discloses a device for tightening or increasing the tension of a line, such as a rope or cord, which is already secured at its ends. The device disclosed in the Malacheski '537 patent comprises a single length of wire or rod that is suitably bent or cut to provide, all in one piece, a handle, a shank extending from the handle and a first bend at the distal end of the shank. A transverse extension extends from the first bend, and a second bend is formed on the distal end of the extension. A stub, extending from the bend, has a terminal end. Rotating the handle and interconnected shank pivots the transverse extension, which takes up slack in a section of the line between the two secured ends and winds that slack portion of the line into convolutions around the shank, thereby increasing the overall tension of the line. When the desired tension is achieved, the transverse extension, and the second bend are positioned so that the second bend receives and holds a section of the line spaced apart from the portion wound about the shank, which prevents the shank and transverse extension from rotating and pivoting in the opposite direction, thereby preventing the tensioned line from unwinding.

The single piece construction of the device disclosed by Malacheski, while apparently simple and inexpensive, nevertheless has some significant shortcomings, which adversely affect its costs and performance. For example, because the handle, shank, extension and stub are all connected as a single piece of metal, the entire device must remain attached to and dangling from the tightened line despite the fact that the handle portion of the single piece tightener is only needed while the line is actually being tightened or released. The handle portion is not needed at all while the tension of the line does not need adjusting and is also not needed while the tightener is being carried or transported but not actually being used. Thus, the handle portion of the single piece tightener adds additional unnecessary weight that users must accommodate. This is particularly disadvantageous when a job or task requires tightening many lines, as would likely be the case when the job comprises pitching a tent or securing cargo. If multiple lines must be tightened while pitching a tent, for example, the camper is forced to obtain and carry multiple tighteners, each one having its own handle. This adds to the load the camper must carry to the camp site. As every hiker knows, a little extra weight can become burdensome over long journeys. For this reason, campers and hikers always look to make their packs as light as possible. Similarly, if many lines must be tightened in order to secure a load of cargo, then a person using Malacheski's line tightening device would have to leave multiple tighteners, each with its own handle, attached to the multiple lines, which increases the weight of the cargo and likely increases the shipping costs.

More importantly, however, the dangling handles on the single piece tighteners can swing and gyrate as the load is moved, or may be subject to buffeting by the wind as the load is in transit. These gyrations and vibrations can cause the handle to strike the load or the vehicle carrying the load, thereby causing severe damage to the cargo or the cargo-moving vehicle. In addition, the gyrations may cause the tightener to disengage from the line, thereby compromising the load's integrity. A tightener that becomes disengaged from a cargo line during transport, such as on a road or highway may become a flying projectile, thereby posing a serious risk of injury or damage to people and property in the vicinity. When a tightener becomes disengaged from the tensioned line, it is also very likely that it will fall to the road or ground and be irretrievably lost. In such cases, it may be very difficult or even impossible to erect a tent or secure the load of cargo without replacing the missing tighteners, thus increasing the costs, time, effort and hassle of using the single piece tighteners.

Therefore, there exists a need for a lighter, more convenient line tightener, which is easier to carry, store and install, and which is much less likely to become disengaged from the tensioned line during use.

SUMMARY OF INVENTION

The present invention addresses the aforementioned problems and disadvantages by providing an improved line tightening device comprising a hook, a detachable handle and a coupler that secures the detachable handle to the hook while the device is being used to tighten or release a line. The hook is adapted for tightening the line by forming and fixing convolutions thereabout. When a line needs tightening, the handle can be quickly and easily attached to the hook and then rotated, thereby rotating the hook and generating the convolutions, thereby increasing the tension in the line. After the convolutions are wrapped about the hook and the line is sufficiently tight, the handle and hook are pivoted so that a stub on the hook prevents uncoiling of the convolutions and locks the hook to the line. The handle and coupler can then be detached and removed from the hook, thereby leaving only the hook portion of the tightener attached to the tensioned line. An optional tether secures the hook to adjacent portions of the tensioned line, thereby ensuring that the hook will not accidently become separated from the tensioned line.

Since the handle and coupler can be detached from the hook, a single handle and coupler can service an unlimited number of hooks. Therefore, in situations where many lines must be tightened, one only needs to obtain and use a single handle and a number of hooks corresponding to the number of lines that need tightening. Since the hooks for tighteners of the present invention are smaller, lighter, and more easily carried and secured, embodiments of the present invention provide a more convenient, less costly and less dangerous solution than conventional line tighteners without detachable handles.

In one embodiment, the line tightener of the present invention comprises a handle for manual operation having a distal end, a hook having a shank portion with a proximal end, and a coupler for removably connecting the proximal end of the shank with the distal end of the handle. An arm extends transversely from a distal end of said shank at an acute angle forming a first bend or bight therebetween. A slack length of line can be located in the first bight and may be wound on the shank forming convolutions thereabout whereby slack in the line is taken up. A distal end of the arm is spaced from the distal end of the shank, and an outer surface of the arm engages the line to form the convolutions about the shank as the handle is rotated in a first direction. A stub extends from the distal end of the arm and forms a second bend or bight spaced from the first bight. The second bight receives a tensioned portion of the line, and the stub extending from the second bight engages the line region in a direction opposite the first direction to thereby resist unwinding of the convolutions from about the shank.

In another embodiment, the tightener employs a tether to secure the hook to the line. The tether is formed of a strip of resilient material and has end portions each formed with a slotted opening to receive the line. An intermediate portion of the tether has an opening located between the slotted openings. The opening in the intermediate portion receives the proximal free end of the shank therethrough, and the slotted openings receive the line on opposite sides of the convolutions at the ends of the tether which cooperate for securing the line and hook together.

BRIEF DESCRIPTION OF THE DRAWINGS

FIGS. 5A-5D are illustrations of the tightener engaged with the line during different phases of tightening.

DETAILED DESCRIPTION OF EXEMPLARY EMBODIMENTS

The present invention and various aspects, features and advantages thereof are explained in detail below with reference to exemplary and therefore non-limiting embodiments and with the aid of the drawings, which constitute a part of this specification and include depictions of the exemplary embodiments.

Figure 1:
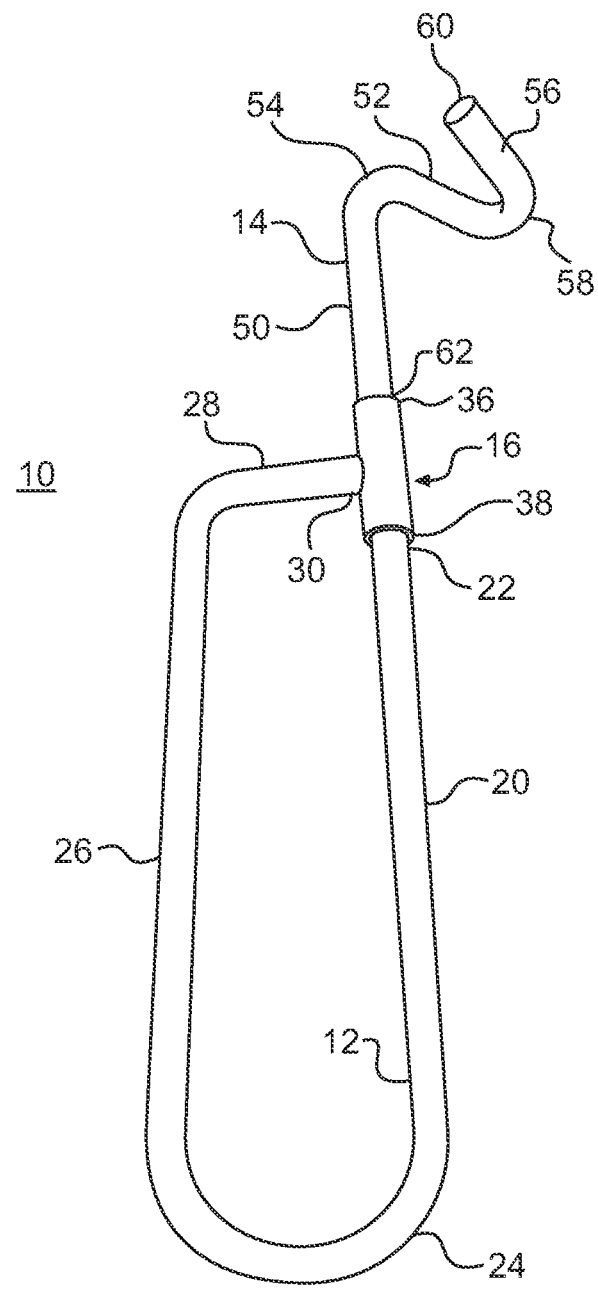
FIG. 1 is a perspective view of a tightening device according to an embodiment of the invention showing the handle portion attached to the tightening portion.
Figure 2:
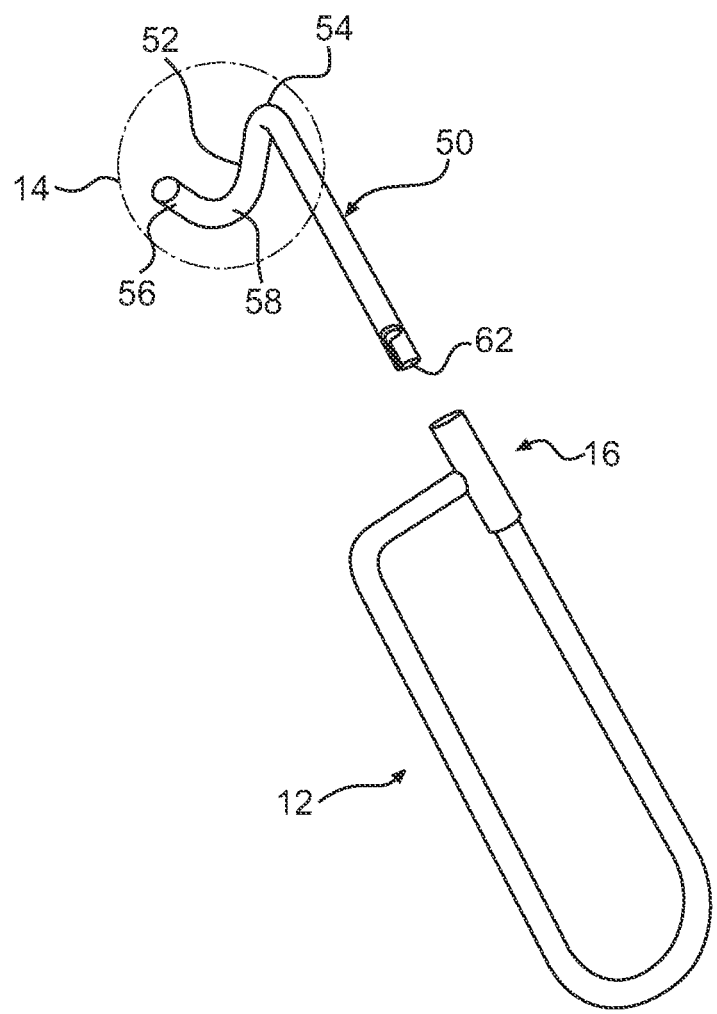
FIG. 2 is an exploded perspective view of the tightening device of FIG. 1.

An embodiment of a tightener 10 for tensioning a slack line is illustrated in FIGS. 1-4. As shown in FIGS. 1 and 2, the tightener 10 comprises a handle 12, a hook 14, and a coupler 16 for detachably securing the handle 12 to the hook 14. The handle 12 typically comprises a closed loop formed of a continuous length of stiff wire or rod. The handle 12 has a leg 20 having an upper end 22, a lower bend 24 connected to a return leg 26, disposed more or less parallel to the leg 20. A bridge 28 connects the upper end of the return leg 26 opposite the bend 24. The distal end 30 of the bridge 28 is connected to the coupler 16, thereby closing the loop on the handle 12 as shown in FIGS. 1 and 2.

As shown in FIGS. 1 and 2, the hook 14 has a shank 50, an arm 52 connected to the shank 50 by a smooth curved first bend or first bight 54 and a stub 56 coupled to the arm 52 by a smooth curved second bight 58 having a terminal end 60. The hook 14 is typically formed of a single piece of stiff metal material, such as aluminum, and extends from the proximal end 62 of the shank 50 to the terminal end 60 of the stub 56.

Figure 3:
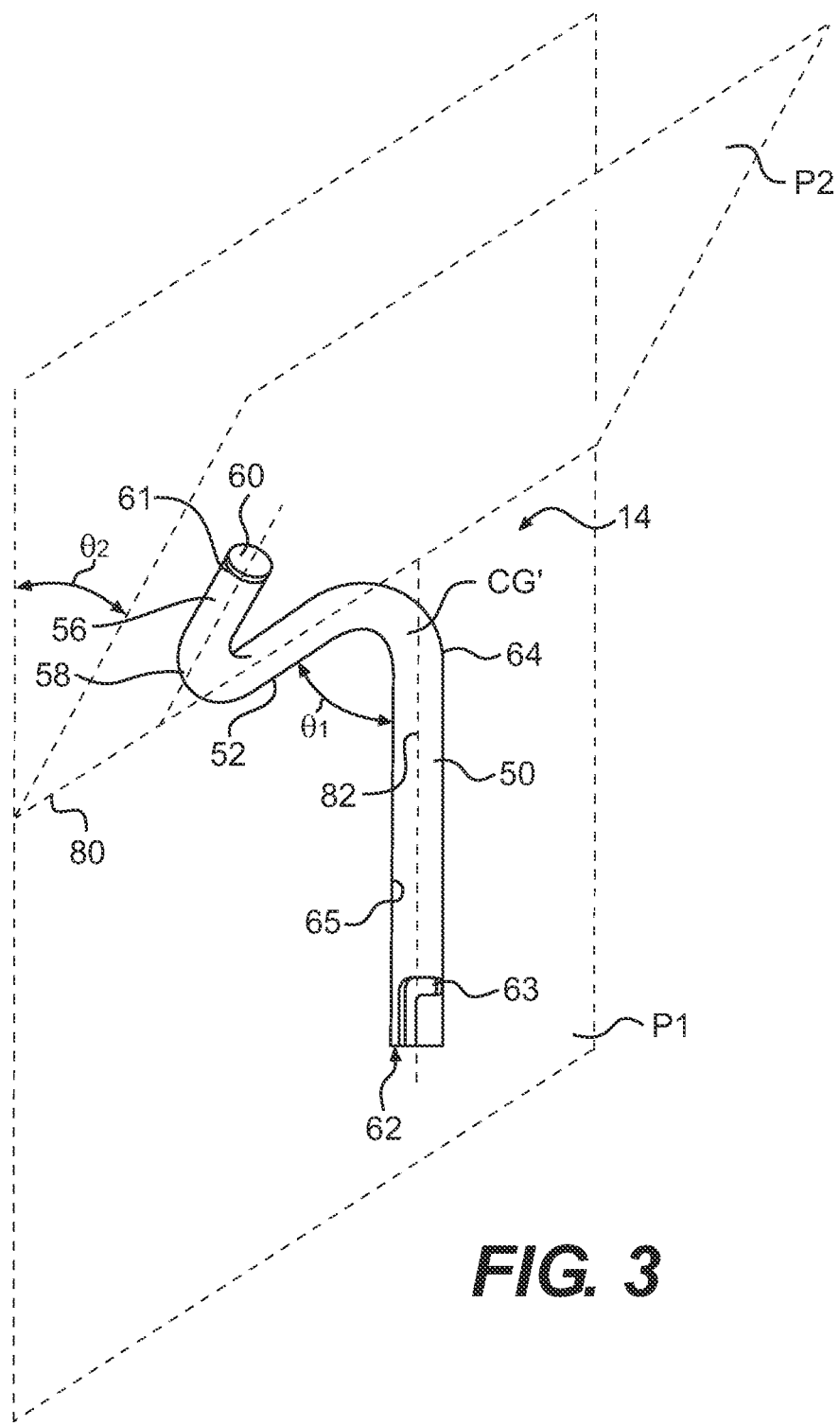
FIG. 3 is a perspective view of the hook.

In an exemplary embodiment, shown in FIG. 3, the proximal end 62 of the shank 50 has a chamfered edge 63, and the terminal end 60 of the stub 56 has a chamfered edge 61. The shank 50 and the interconnected arm 52 are disposed in a first plane P1 at an acute angle θ1, e.g. 50°, with respect to each other. The arm 52 and the connected stub 56 are typically disposed in a second plane P2 at an angle θ2, e.g., 35°, relative to the first plane P1. The first plane P1 and the second plane P2 intersect along a common line corresponding to a central axis 80 of the arm 52. As a result, the shank 50, arm 52 and stub 56 do not lie in a common plane, which permits the second bight 58 to be disposed such that it hooks about the tensioned line L at the angle $θ_2$ between the first plane P1 and the second plane P2. See FIGS. 5B and 5D.

Figure 4:
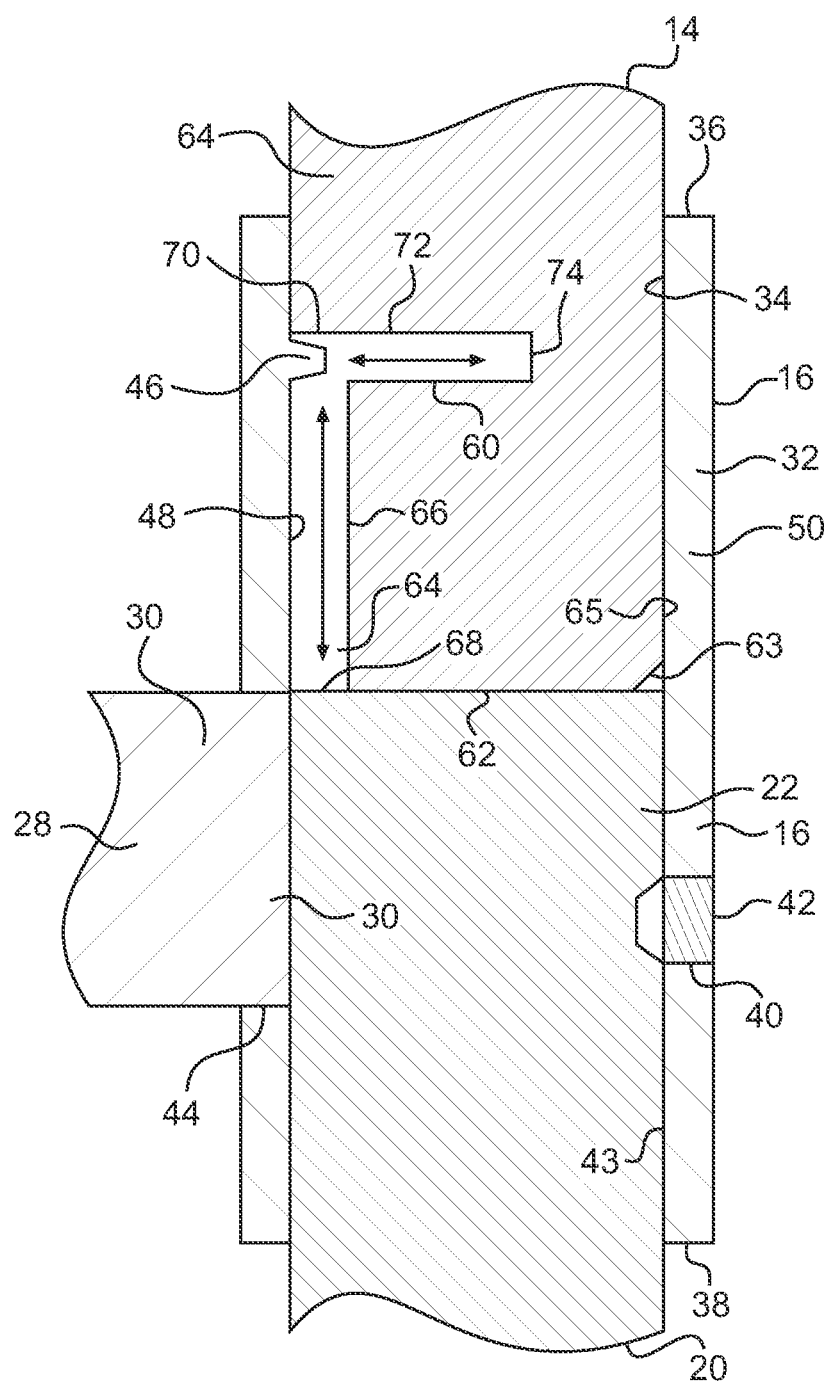
FIG. 4 is an enlarged fragmentary elevation of the handle and hook secured by the coupler.

FIG. 4 shows an enlarged fragmentary elevation of the handle 12 and hook 14 secured by the coupler 16. The coupler 16 comprises a cylindrical sleeve 32 having a through hole 34 extending between open upper end 36 and open lower end 38, as shown. A threaded diametric hole 40 is formed in a lower portion of the coupler, and a set screw 42 is threaded into the hole 40. Upper or distal end 22 of the leg 20 is positioned in the lower portion of the sleeve 32 through the open lower end 38 on the coupler 16. A sidewall 43 of the leg 20 is disposed in the coupler 16 opposite the threaded hole 40, and the leg 20 is secured in the coupler 16 by the set screw 42 engaging the sidewall 43.

The coupler 16 has a second diametric hole 44 located approximately midway along the length of the coupler 16. Distal free end 30 of the bridge 28 is secured in the diametric hole 44 by an interference fit. Alternatively, the coupler 16 may be secured to the end of the leg by welding or other suitable method. A radial detent 46 is formed in the inner wall 48 of the coupler 16 in the upper portion thereof. The detent 46 extends radially inwardly of the through hole 34 in the coupler.

As shown in FIG. 4, the proximal end 62 of the shank 50 is formed with an L-shaped slot 64 formed in an outer wall 65. The slot 64 has an axial portion 66 having an open end 68 at the proximal end 62 of the shank 50 and an inboard end 70 spaced from the open end. The slot has a transverse portion 72 disposed circumferentially in the wall 64 of the shank 50. The transverse portion 72 is connected to the inboard end 70 of the axial portion 66 and has a closed end 74 spaced therefrom. The radial detent 46 engages the slot 64 for detachably securing the proximal end 50 of the shank in the coupler 14.

The handle 12 and shank 50 may be secured and detached by manual operation. The shank 50 may be inserted in the open upper end 36 of the coupler 16 with the slot or groove 64 in alignment with the detent 46. As the proximal end 62 of the shank 50 is inserted into the upper open end 36 of the coupler 16, the open end 68 of the axial portion 66 receives the radial detent 46 and guides the shank 50 axially into the coupler 16. The detent 46 guides the shank 50 until it reaches the inboard end 70 of the transverse portion 72 of L-shaped slot 64. The handle 12 is then rotated so that the radial detent 46 is guided circumferentially to the closed end 74 thereof, whereby the hook 14 is removably secured in the handle 12.

The hook 14 may be separated from the handle 12 by reversing the rotation of the shank 50, and when the detent 46 reaches the inboard end 70 of the axial portion 66 of the L-shaped slot 64, the handle 12 is pulled axially away from the shank 50, whereby the detent 46 is guided through the open end 68 of the axial portion 66, and the shank 50 is thereby separated. The result is a quick connect/disconnect arrangement for securing the shank 50 to the handle 12.

The described arrangement causes the second bight 58 to more firmly engage the tensioned line L, by orienting the shank 50, the arm 52 and the second bight 58 so that the handle 12 has to be rotated about its axis 82 in a first direction, e.g. counter-clockwise (CCW), so that its axis lies at a slight angle with respect to the line L to thereby allow the terminal end 60 of the stub 56 to pass below the line L as the convolutions 86 are formed. See FIGS. 5B and 5C. After the final convolution is formed, the handle 12 is rotated or pivoted side to side about the first bight 54, more or less in a vertical plane P3 including the line L. See FIG. 5D. As a result, the terminal end 60 of the stub 56 moves above the line L and the second bight 58 is positioned to receive the tensioned line L as the handle 12 is rotated in the opposite direction, e.g., clockwise (CW), to allow the second bight 58 to engage the line and secure the convolutions. In the arrangement described, in order to disengage the tightener, the handle 12 is rotated in the first direction CCW to cause the shank 50 to rotate in the same direction. The shank 50 is then pivoted side to side about the first bight 54 in the vertical plane P3 to clear the line L.

The claimed embodiments provide several advantages over prior arrangements. In the exemplary embodiment, the handle 12 and the coupler 16 secured thereto are separable from the hook 14. In the discussion below, rather than refer to the handle and coupler separately, when the handle or removable handle is mentioned, it should be understood that the coupler, normally attached to the handle, is included.

The removable handle 12 allows for a substantial reduction in weight on the line being tightened because, after the line is tightened to the desired tension, the handle 12 and coupler 16 of the tightener are removed, leaving only the hook 14 of the tightener attached to the tensioned line, thereby permitting the device to be used in more line-tightening applications when the weight and number of devices needed to do the job are an important concern. For example, when erecting a tent where multiple lines must be tightened, it is advantageous to reduce the weight of the line tightening tools that must be carried to the campsite. Embodiments of the current invention permit users to operate and install a multiplicity of hooks on a respective multiplicity of lines using a single handle 12 to secure the multiple hooks.

Figure 6:
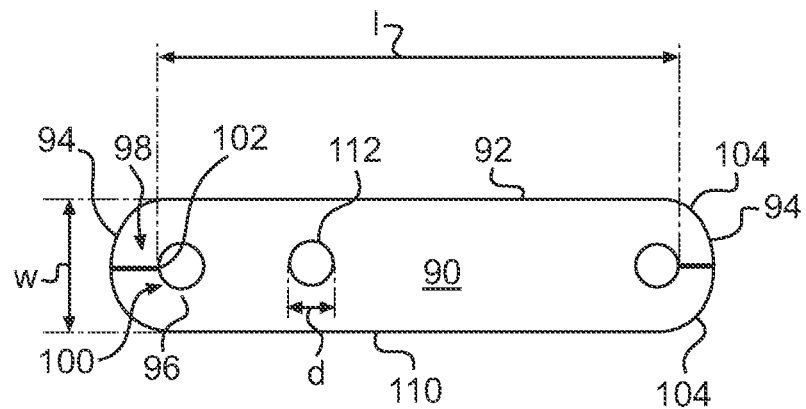
FIG. 6 is an illustration of a tether for securing the hook to the line.
Figure 7A:
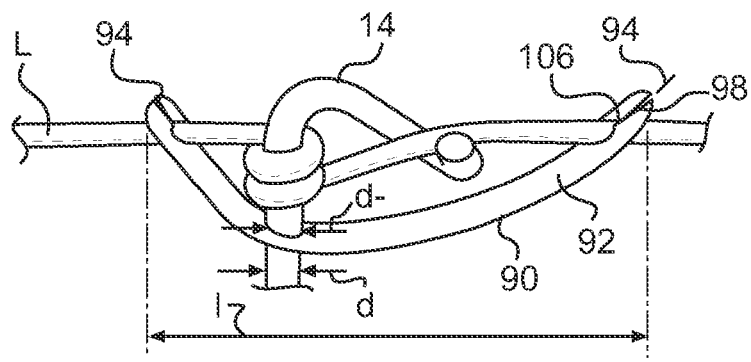
FIGS. 7A-7B are respective side and plan views of the hook secured to the line by the tether of FIG. 6.
Figure 7B:
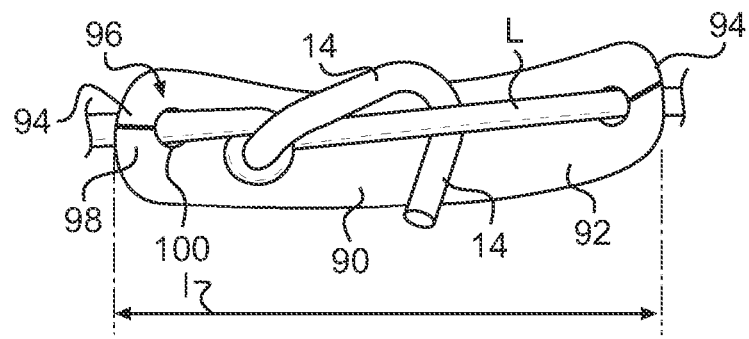

In order to reduce the possibility of an accidental release of the tightener, a tether is provided for securing the hook to the line L after the handle 12 is removed. As illustrated in FIGS. 6 and 7A-7B, tether 90 is constructed so that the hook 14 remains securely attached to the line L. The tether 90 comprises a strip 92 of resilient, pliable material, such as a polymeric material having ends 94, a length l, and a width w. The length l of the tether 90 is long enough so that each end 94 can extend from the hook 14 on the tightener to two points along the line L. The strip 92 is formed of a slotted opening 96 at each of the opposite ends 94. Each slotted opening 96 has a slit portion 98 and an end hole 100 formed near the opposite ends 94 of the strip 92. The slit portion 98 extends axially from the end 94 of the strip 92 to an inboard end 102. The end hole 100 is located at the inboard end 102 in communication with the slit portion 98. Each slotted opening 96 thus forms lateral tabs 104 on each side thereof, which tabs may be deformed to allow the slotted openings to receive therein the line L adjacent to the opposite sides of the installed hook 14 of the tightener 10.

The strip 92 has an intermediate portion 110 formed with a center hole 112 between the slotted openings. In the exemplary embodiment, the shank 50 is a rod having a diameter d. The slotted openings 96 receive the line L therein, and the center hole 112 receives the proximal end 62 of the shank 50 therein. The center hole 112 has a diameter d-, slightly smaller than the diameter d of the shank 50, such that it may receive the proximal end of the shank 50 therethrough. The chamfered portion 63 at the proximal end 62 of the shank 50 allows the shank 50 to be more easily inserted through the center hole 112 which stretches as the chamfered end 63 enters it. Because the diameter d of the shank 62 is slightly larger than the diameter of the hole 112, and the chamfered end 63 is slightly smaller than the hole, the shank 50 enters the center hole 112 with some resistance, so that once installed on the shank 50, the tether 90 will not easily slide off the shank 50 without applying substantial pulling force to it. The center hole 112 may be nearer one end of the strip, as shown, because the hook 14 presents a larger profile on one side when installed on the line L.

After the tether 90 is attached to the installed tightener by pushing the shank 50 through the through center hole 112, each line portion L on either side of the second bight 58 is pushed into each corresponding slotted opening 96 of the strip. The lateral tabs 104 may be twisted to open the slit portion 98 so that the line L may be pushed through the slit and forced into the end hole 100 connected thereto. Such an arrangement thus secures the shank to the line via the strip forming the tether.

Figure 8:
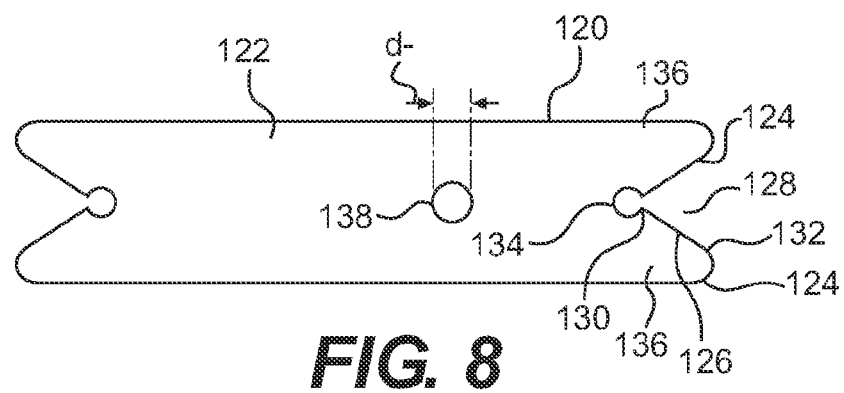
FIG. 8 is a plan view of an alternative embodiment of the tether.

In another embodiment shown in FIG. 8, the tether 120 comprises a strip 122 of resilient material having ends 124 and slotted openings 126 at each end. In this arrangement, the slotted openings 126 comprise a V notch 128 having an apex 130 and a wide marginal opening 132 at the end 124 of the strip 122. Adjacent each V notch 128, end holes 134 are formed in communication with the apex 130. Tabs 136 are thus formed adjacent the end holes 134. A center hole 138 is formed intermediate from the ends 124. As noted above, the center hole 112 may be nearer one end of the strip 122 because the hook 14 presents a larger profile on one side as installed on the line L.

The wide marginal opening 132 of the V notch receives the line L therein more easily and with little or no manipulation of the tabs 136, thus allowing ease of installation. The tether 120 is similar to the tether 90 described above and operates in essentially the same way to secure the hook to the line L.

The ability to separate the handle and coupler from the hook improves the effectiveness and reliability of the tightener. In a conventional arrangement, as in the exemplary embodiment, the handle provides leverage to aid the user in tightening the line. However, in a conventional device the handle is not separated from the hook. As a result, the unitary device tends to hang from the tightened line like a pendulum.

Figure 9:
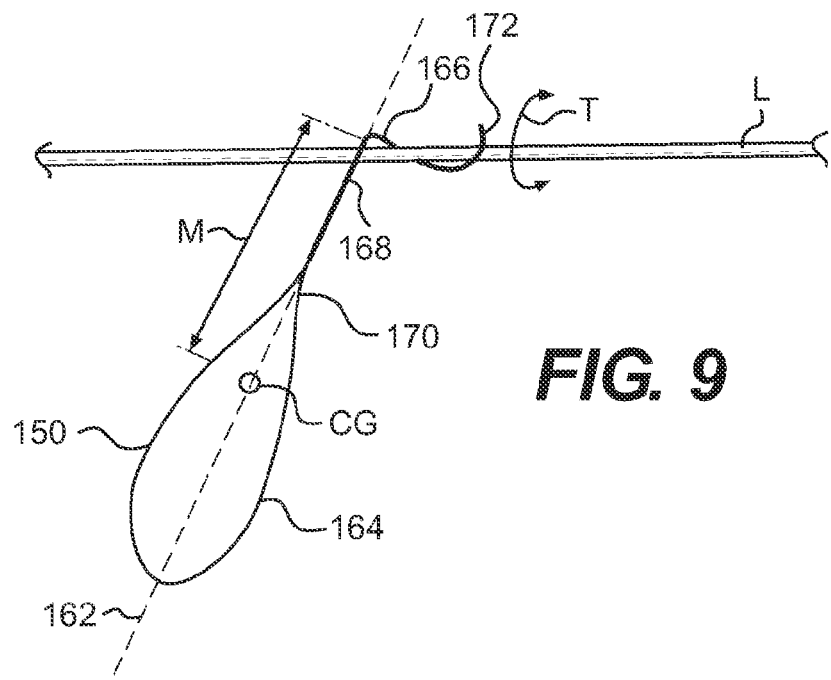
FIG. 9 is an illustration of a conventional one piece tightener.

The center of gravity CG of a conventional unitary device 150, shown in FIG. 9, tends to be somewhere along the axis 162 of the device in the handle region 164 below the hook part 166 which is closely secured to the line L. This happens because the handle part 164 is typically larger than the hook part 166. As a result, the handle part 164, the shank part 168 and the center of gravity CG of the installed conventional tightener 160 tends to be pulled by the weight of the handle 164 below the line L. This means that the center of gravity CG is spaced from the line by some distance M. Consequently a moment arm 170 having a length M extends between where the hook part 166 engages the line L and where the center of gravity CG is located. The moment arm 170 thus results in a mechanical advantage about the line L. Therefore any lateral motion of the line or the tightener caused by vibrations or wind pressure is amplified by the mechanical advantage caused by the position of the center of gravity CG relative to the line. Thus, the handle is more likely to gyrate or randomly swing more forcefully about the line. Such gyrations may impart a torque T to the hook part 166 as it engages the tightened line. If the motion is excessive, the stub 172 may overcome the torque and cause the stub to jump the tightened line and thereby become disengaged from the tightener causing it to unwind and drop away. With no tightener in place, the line will become slack.

If there are sufficient lines to keep the load stabilized, this may not result in an immediate hazard. However, if there are not enough lines to provide a margin of safety, or if more than one line becomes slack, the result can cause a dangerous and unsafe condition. This is particularly dangerous when the device is being used to secure or stabilize fragile or a heavy load. A fragile load may be damaged even if it only shifts a little. However, if the load is heavy, people who handle the load or bystanders may be injured if the load moves and strikes them. Such a possibility is not an acceptable risk.

The exemplary embodiment can reduce this risk considerably because, when the handle 12 is not attached to the hook 14, as shown in FIG. 3, the center of gravity CG' is within the length of the hook somewhere along the shank 50 and the stub 56. Thus, the center of gravity is closer to the line and the mechanical advantage and resulting torque applied to the line is significantly reduced. Accordingly, the probability of the stub jumping the line, and thus causing the hook to become a hazard is reduced.

Another disadvantage of a unitary device is that, in a windy environment, for example when the device is used for securing a load on a moving vehicle, if the wind or vibrations are strong enough the device may not only fall away as noted, but the handle may also fly away in the wind and strike the load or vehicle with such force so as to cause damage to either or both the load or the vehicle. By removing the handle the overall weight and surface area are reduced. As a result, the mechanical advantage noted above is reduced, and the wind resistance is reduced. Embodiments of the current invention may be less likely to be forcefully projected by the wind, because the resulting overall forces on the device are reduced. Consequently the likelihood of damage to the load, the vehicle or a passerby is reduced.

A smaller device also presents a low visual profile, and it is less likely to attract the attention of unauthorized or curious persons.

Figure 10:
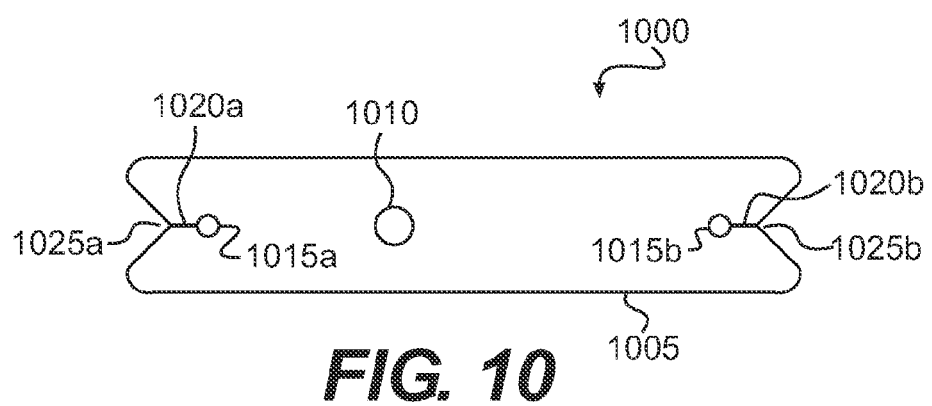
FIG. 10 shows a plan view of still another alternative embodiment of the tether.

In still another embodiment of the tether, shown in FIG. 10, tether 1000 comprises a strip 1005 of resilient material having openings 1015a and 1015b at each end. In this arrangement, the openings 1015a and 1015b comprise V notches 1025a and 1025b, which are connected to the openings 1015a and 1015b by slots 1020a and 1020b. A center hole 1010 is provided at or near the center portion of the strip 1005 to accommodate the shank 50 of the hook 14. As noted above, the center hole 1010 may be located nearer one end of the strip 1005 because the hook 14 presents a larger profile on one side when it is installed on the line L.

While the device described above and depicted in the figures is configured for right-handed users, it is understood that it may be suitably reconfigured for left-handed users by, for example, using a hook comprising a mirror image of the hook 14 shown in FIG. 1, such that the arm 52 extends from the opposite side the shank 50 and the stub 56 extends from the opposite side of the arm 52 (both offset by 180 degrees).

While there has been described what at present are considered to be exemplary embodiments, it will be apparent to those skilled in the art, that various modifications may be made therein, and it is intended in the appended claims that such modifications fall within the spirit and scope thereof.

What is claimed is:

1. A line tightener for taking up slack in a line comprising:
   a handle having a distal end;
   a shank having a proximal free end and a distal end remote therefrom;
   a coupler located between the distal end of the handle and the proximal free end of the shank for removably securing the shank to the handle, and wherein a slack portion of the line can be wound about the shank to form convolutions thereabout to take up slack in the slack portion;
   an arm extending from the distal end of said shank forming a first bight therebetween for receiving a line region located in the slack line portion, said arm having a distal end remote from the shank, and an outer surface for engaging the line to form the convolutions about the shank as the handle is rotated in a first direction;
   a stub extending from the distal end of the arm forming a second bight therebetween and having a terminal end being spaced from said second bight, said second bight engaging the line and being urged by tension to engage said line in a direction opposite the first direction to thereby resist unwinding of the convolutions from about said shank; and
   a tether formed of a strip of resilient material having end portions each formed with a slotted opening to receive corresponding line portions adjacent the shank, and an intermediate portion between the slotted openings formed with a center hole therein, said center hole for receiving the proximal free end of the shank therethrough, said tether cooperating with the shank and the line for securing the line and shank together.

2. The line tightener according to claim 1, wherein said shank, arm and stub are fabricated from a continuous length of rod.

3. The line tightener according to claim 1, wherein said first bight comprises a smooth bend connecting the arm and the shank at an acute angle, and said second bight comprises a smooth bend connecting the stub and the arm at an acute angle.

4. The line tightener according to claim 3, wherein said shank and arm lie in a first plane, and said arm and said stub lie in a second plane different from the first plane and the first and second planes intersect along a line including a central axis of the arm.

5. The line tightener according to claim 4, wherein said stub extends at an angle out of the first plane.

6. The line tightener according to claim 1, wherein the coupler comprises a quick release connector for securing the shank and handle together.

7. The line tightener according to claim 1, wherein the coupler comprises a cylindrical sleeve having a side wall and a through bore open at opposite ends.

8. The tightener according to claim 7, wherein said coupler has a radial detent extending from an inside side wall into the through bore.

9. The tightener according to claim 8, wherein the proximal free end of the shank has an L shaped slot formed in an outer surface thereof, one leg of said L shaped slot having an open end at the proximal free end of the shank and extending axially to an inboard end, said slot having a transverse portion extending circumferentially along the outer wall of the shank from the inboard end of the slot of the axial portion to a closed terminal end, said slot for receiving the detent therein for movement between the open end and the closed terminal end.

10. The line tightener according to claim 9, wherein the coupler receives the proximal free end of the shank and the slot receives the detent therein for guiding the shank axially along the sleeve between the open end and the axial portion and the terminal end of the transverse portion via the inboard end of the axial portion, for securing and releasing the shank and the handle.

11. The line tightener according to claim 1, wherein the slotted opening in each end of the strip comprises a slotted portion extending from the end of the strip axially inboard thereof, and a circular hole portion connected to the inboard end of the slot.

12. The line tightener according to claim 11, wherein the slot has a V shape wherein an apex of the V intersects the circular hole portion and an open end of the slot is adjacent the end of the strip for receiving the line therein.

13. The line tightener according to claim 1 wherein the proximal end of the shank has a chamfered edge.

14. A line tightener for taking up slack in a line comprising:
a handle having a distal end;
a shank having a proximal free end and a distal end remote therefrom;
a coupler located between the distal end of the handle and the proximal free end of the shank for removably securing the shank to the handle, and wherein a slack portion of the line can be wound about the shank to form convolutions thereabout to take up slack in the slack portion;
an arm extending from the distal end of said shank forming a first bight therebetween for receiving a line region located in the slack line portion, said arm having a distal end remote from the shank, and an outer surface for engaging the line to form the convolutions about the shank as the handle is rotated in a first direction; and
a stub extending from the distal end of the arm forming a second bight therebetween and having a terminal end being spaced from said second bight, said second bight engaging the line and being urged by tension to engage said line in a direction opposite first direction to thereby and resist unwinding of the convolutions from about said shank.

15. The line tightener according to claim 14, wherein the coupler comprises a quick release connector for securing the shank and handle together.

16. The line tightener according to claim 14, wherein said first bight comprises a smooth bend connecting the arm and the shank at an acute angle, and said second bight comprises a smooth bend connecting the sub and the arm at an acute angle.

17. The line tightener according to claim 14, wherein said shank and arm lie in a first plane, and said arm and said stub lie in a second plane different from the first plane and the first and second planes intersect along a line including a central axis of the arm.

18. The line tightener according to claim 14, wherein the coupler comprises a cylindrical sleeve having a side wall and a through bore open at opposite ends, and a radial detent extending from an inside side wall into the through bore.

19. The tightener according to claim 18 wherein the proximal free end of the shank has an L shaped slot formed in an outer surface thereof, one leg of said L shaped slot having an open end at the proximal free end of the shank and extending axially to an inboard end, said slot having a transverse portion extending circumferentially along the outer wall of the shank from the inboard end of the slot of the axial portion to a closed terminal end, said slot for receiving the detent therein for movement between the open end and the closed terminal end.

20. The line tightener according to claim 14 further comprising: a tether formed of a strip of resilient material having end portions each formed with a slotted opening to receive corresponding line portions adjacent the shank, and an intermediate portion between the slotted openings formed with an opening therein, said opening for receiving the proximal free end of the shank therethrough, said tether cooperating with the shank and the line for securing the line and shank together.

21. The line tightener according to claim 20, wherein the slotted opening in each end of the strip comprises a slotted portion extending from the end of the strip axially inboard, and a circular hole portion connected to the inboard end of the slot.

22. The line tightener according to claim 20, wherein the slot has a V shape wherein an apex of the V intersects the circular hole portion and an open end of the slot is adjacent the end of the strip for receiving the line therein.

23. The line tightener according to claim 14, wherein the proximal end of the shank has a chamfered edge.

\* \* \* \* \*

UNITED STATES PATENT AND TRADEMARK OFFICE
CERTIFICATE OF CORRECTION

PATENT NO. : 8,544,784 B2  
APPLICATION NO. : 13/267399  
DATED : October 1, 2013  
INVENTOR(S) : Richard J. Zenda Page 1 of 1

It is certified that error appears in the above-identified patent and that said Letters Patent is hereby corrected as shown below:

In the Claims

Column 9, Line 31: insert --the-- between "opposite" and "first".

Column 9, Line 32: delete "and" before "resist".

Signed and Sealed this  
Twenty-fourth Day of June, 2014

Michelle K. Lee  
*Deputy Director of the United States Patent and Trademark Office*